United States Patent
Wu et al.

(10) Patent No.: US 11,221,838 B2
(45) Date of Patent: Jan. 11, 2022

(54) HOT UPDATE METHOD, OPERATING SYSTEM, TERMINAL DEVICE, SYSTEM, AND COMPUTER-READABLE STORAGE MEDIUM FOR A SYSTEM PROCESS

(71) Applicant: Baidu Online Network Technology (Beijing) Co., Ltd., Beijing (CN)

(72) Inventors: Lin Wu, Beijing (CN); Shufan Yang, Beijing (CN); Chenfu Bao, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 48 days.

(21) Appl. No.: 16/698,534

(22) Filed: Nov. 27, 2019

(65) Prior Publication Data
US 2020/0264863 A1 Aug. 20, 2020

(30) Foreign Application Priority Data

Feb. 19, 2019 (CN) .......................... 201910124942.3

(51) Int. Cl.
*G06F 8/65* (2018.01)
*G06F 9/54* (2006.01)
*G06F 9/48* (2006.01)
*G06F 9/30* (2018.01)

(52) U.S. Cl.
CPC .............. *G06F 8/65* (2013.01); *G06F 9/3009* (2013.01); *G06F 9/30043* (2013.01); *G06F 9/4843* (2013.01); *G06F 9/545* (2013.01)

(58) Field of Classification Search
None
See application file for complete search history.

(56) References Cited

U.S. PATENT DOCUMENTS

| 9,335,986 B1 * | 5/2016 | Bowen | G06F 8/656 |
| 2004/0181790 A1 * | 9/2004 | Herrick | G06F 8/60 717/168 |

(Continued)

FOREIGN PATENT DOCUMENTS

| CN | 103942073 A | 7/2014 |
| CN | 106528411 A | 3/2017 |

(Continued)

OTHER PUBLICATIONS

"The Merriam-Webster Dictionary," 2005, Merriam-Webster, Inc., p. 255. (Year: 2005).*

(Continued)

*Primary Examiner* — Qing Chen
(74) *Attorney, Agent, or Firm* — Polsinelli PC

(57) ABSTRACT

A hot update method, an operating system, a terminal device, and a storage medium are provided according to embodiments. The method includes: receiving startup information of a system process sent by a hot update agent thread; checking a hot patch corresponding to the system process, in response to the startup information; and sending a patch processing request to the hot update agent thread, so as to request the hot update agent thread to invoke a patch repairing framework in response to the patch processing request. The embodiments can implement hot update of the framework and protect the security of the entire Framework layer and the APP layer.

14 Claims, 7 Drawing Sheets

(56) References Cited

U.S. PATENT DOCUMENTS

| | | | | |
|---|---|---|---|---|
| 2004/0205754 | A1* | 10/2004 | Gazda | G06F 9/45537 718/100 |
| 2005/0015760 | A1* | 1/2005 | Ivanov | G06F 21/57 717/168 |
| 2005/0132348 | A1* | 6/2005 | Meulemans | H04L 67/1095 717/168 |
| 2005/0188259 | A1* | 8/2005 | Zweifel | G06F 8/658 714/23 |
| 2005/0256664 | A1* | 11/2005 | Blumfield | G06F 8/65 702/121 |
| 2005/0257207 | A1* | 11/2005 | Blumfield | G06F 8/65 717/168 |
| 2005/0257208 | A1* | 11/2005 | Blumfield | G06F 8/65 717/168 |
| 2006/0101457 | A1* | 5/2006 | Zweifel | G06F 8/71 717/174 |
| 2010/0131956 | A1* | 5/2010 | Drepper | G06F 9/5011 718/104 |
| 2012/0089973 | A1* | 4/2012 | Bhat | G06F 8/658 717/169 |
| 2014/0059528 | A1* | 2/2014 | Gagliardi | G06F 8/656 717/170 |
| 2014/0143767 | A1* | 5/2014 | Nigul | G06F 8/71 717/170 |
| 2014/0237463 | A1* | 8/2014 | Sriram | G06F 8/61 717/172 |
| 2014/0282462 | A1* | 9/2014 | Peckham | G06F 9/485 717/168 |
| 2015/0169329 | A1* | 6/2015 | Barrat | G06F 9/5077 713/2 |
| 2015/0381767 | A1 | 12/2015 | Spence | |
| 2016/0092203 | A1* | 3/2016 | Filali-Adib | G06F 8/656 717/171 |
| 2016/0216962 | A1* | 7/2016 | Wang | G06F 8/71 |
| 2017/0344361 | A1* | 11/2017 | Zhang | G06F 8/654 |
| 2019/0384591 | A1* | 12/2019 | Ramachandran | G06F 8/656 |
| 2020/0201618 | A1* | 6/2020 | Graham | G06F 8/61 |

FOREIGN PATENT DOCUMENTS

| | | |
|---|---|---|
| CN | 107451474 A | 12/2017 |
| CN | 107870777 A | 4/2018 |
| CN | 107958150 A | 4/2018 |
| CN | 109002320 A | 12/2018 |

OTHER PUBLICATIONS

China National Intellectual Property Administration, Notification of the First Office Action, mailed in connection with Chinese Application No. 2019101249423, dated Nov. 3, 2021 (10 Pages).

China National Intellectual Property Administration, Search Report, mailed in connection with Chinese Application No. 2019101249423, dated Nov. 3, 2021 (4 Pages).

* cited by examiner

HOT UPDATE METHOD, OPERATING SYSTEM, TERMINAL DEVICE, SYSTEM, AND COMPUTER-READABLE STORAGE MEDIUM FOR A SYSTEM PROCESS

CROSS-REFERENCE TO RELATED APPLICATION

This application claims priority to Chinese Patent Application No. 201910124942.3, filed on Feb. 19, 2019, which is hereby incorporated by reference in its entirety.

TECHNICAL FIELD

The present disclosure relates to the field of computer technologies, and in particular, to a hot update method, an operating system, a terminal device, and a storage medium.

BACKGROUND

The Android operating system is an open source operating system that can be applied to mobile devices such as smartphones and tablets. The architecture of the Android operating system mainly includes: the kernel layer (Linux Kernel), the system runtime library (Libraries), the application framework layer (Application Framework, Framework), and the application (Application, APP).

As a framework layer, the framework can provide an application programming interface (API) for upper-layer applications. Due to the open source and popularity of the Android operating system, the framework is prone to many vulnerabilities.

At present, almost all of the hot update mechanism of the Android operating system can only be applied to the APP, and the framework vulnerabilities cannot be repaired. The device manufacturer updates codes of the framework layer by pushing upgrade of the version of the system so as to repair the vulnerability. However, due to a wide variety of Android devices even produced by the same manufacturer, the operating system is severely fragmented, and it is difficult to upgrade the Android devices uniformly to the latest version. In addition, the repair cycle for a vulnerability, starting from the discovery, to the patch generation, to the operator audit, and last to stage for the user to download the patch and restarts the device, is too long, resulting in unable to repair the vulnerability in time, which may pose a great threat to the security.

SUMMARY

According to the embodiments of the present disclosure, a hot update method, an operating system, a terminal device, and a storage medium are provided, to solve one or more technical problems in the existing technology.

In a first aspect, a hot update method is provided according to an embodiment of the present disclosure, the method includes:
receiving startup information of a system process sent by a hot update agent thread;
checking a hot patch corresponding to the system process, in response to the startup information; and
sending a patch processing request to the hot update agent thread, so as to request the hot update agent thread to invoke a patch repairing framework in response to the patch processing request.

In one embodiment, the sending a patch processing request to the hot update agent thread, so as to request the hot update agent thread to invoke a patch repairing framework in response to the patch processing request, includes:
determining a processing type of the hot patch; sending to the hot update agent thread a patch processing request corresponding to the processing type of the hot patch.

In an embodiment, the processing type includes at least one of a loading type, a loading and repairing type, a repairing type and an unloading type, and the patch processing request comprises at least one of a patch loading request, a patch loading and repairing request, a patch repairing request and a patch unloading request, and
the sending to the hot update agent thread a patch processing request corresponding to the processing type of hot patch, includes:
sending to the hot update agent thread the patch loading request and file information of the hot patch in response to the loading type of the hot patch, so as to request the hot update agent thread to invoke the patch repairing framework to determine the location of the hot patch according to the file information and load the hot patch into the system process;
sending to the hot update agent thread the patch loading and repairing request and file information of the hot patch in response to the loading and repairing type of the hot patch, so as to request the hot update agent thread to invoke the patch repairing framework to determine the location of the hot patch according to the file information, load the hot patch into the system process, and repair a vulnerability with the hot patch;
sending to the hot update agent thread the patch repairing request in response to the repairing type of hot patch, so as to request the hot update agent thread to invoke the patch repairing framework to repair a vulnerability with the hot patch in the system process;
sending to the hot update agent thread the patch unloading request in response to the unloading type of hot patch, so as to request the hot update agent thread to invoke the patch repairing framework to unload the hot patch from the system process.

In an embodiment, the hot update method further includes:
receiving a new hot patch sent by the server, and determining a processing type of the new hot patch and a system process corresponding to the new hot patch;
sending to the system process corresponding to the new hot patch, a patch processing request corresponding to the processing type of the new hot patch.

In an embodiment, the hot update method further includes:
receiving, by the hot update agent thread, the patch processing request, and invoking a security controller to detect whether the received patch processing request is permissible, wherein a first safety signal is returned from the security controller to the hot update agent thread in response to a permissible patch processing request;
invoking, by the hot update agent thread, the patch repairing framework to perform an operation corresponding to the patch processing request in response to the first safety signal.

In an embodiment, the receiving, by the hot update agent thread, the patch processing request, and invoking a security controller to detect whether the received patch processing request is permissible, includes:
invoking, by the hot update agent thread, the security controller to verify validity and integrity of the hot patch, in response to the patching processing request being a patch loading request or a patch loading and repairing request, wherein when the validity and integrity of the hot patch is verified, a second security signal is returned by the security controller to the hot update agent thread;

invoking, by the hot update agent thread, the patch repairing framework to load the hot patch into the system process in response to the second safety signal.

In one embodiment, the hot update method further includes:

starting the system process based on a startup code of the system process, wherein the startup code comprises a creation and startup code of the hot update agent thread; and creating and starting the hot update agent thread in response to a start of the system process.

In an embodiment, the system process loads a system runtime library in response to a start of the system process, to create and start the hot update agent thread in the system process, and the system runtime library includes the hot update agent thread.

In a second aspect, an operating system is provided according to an embodiment of the present disclosure, the operating system includes:

a system process;

a management process configured to perform the above method;

a hot update agent thread configured to receive a patch processing request from the management process;

a patch repairing framework configured to perform an operation corresponding to the patch processing request under an invoke of the hot update agent thread.

In an embodiment, the operating system further includes:

a security controller, configured to detect, when the patch processing request is received by the hot update agent thread, whether the received patch processing request is permissible, wherein a first safety signal is returned from the security controller to the hot update agent thread in response to a permissible patch processing request, wherein the hot update agent thread is further configured to invoke the patch repairing framework to perform an operation corresponding to the patch processing request in response to the first safety signal.

In an embodiment, the hot update agent thread is further configured to invoke the security controller to verify validity and integrity of the hot patch, in response to the patching processing request being a patch loading request or a patch loading and repairing request, wherein when the validity and integrity of the hot patch is verified, a second security signal is returned by the security controller to the hot update agent thread, and the hot update agent thread is further configured to invoke the patch repairing framework to load the hot patch into the system process in response to the second safety signal.

In an embodiment, the operating system further includes:

a framework layer, which includes a startup code of the system process, for starting the system process, the startup code includes a creation and startup code of the hot update agent thread, for creating and starting the hot update agent thread in response to a start of the system process.

In an embodiment, the operating system further includes:

a system runtime library, which includes the hot update agent thread;

the system process includes:

a loading module, configured to load the system runtime library in response to a start of the system process, to create and start the hot update agent thread in the system process.

In a third aspect, a terminal device is provided according to an embodiment of the present disclosure, where the function of the terminal device can be implemented by using hardware or by hardware executing corresponding software. The hardware or software includes one or more modules corresponding to the functions described above.

In an embodiment, the terminal device structurally includes a processor and a memory configured to store a program supporting the terminal device to perform the above method, the processor being configured to execute the program stored in the memory. The terminal device may also include a communication interface for communicating with other devices or communication networks.

In a fourth aspect, a tangible, non-transitory, computer-readable media is provided according to an embodiment of the present disclosure, which is configured to store a computer software instructions used by the terminal device, including a program configured to execute the foregoing method.

The above technical solution creates a hot repair agent thread in the system process, invokes the patch repairing framework according to the interaction between the hot repair agent thread and the management process, and dynamically repairs each system process in real time, and can implement hot update of the framework without restarting the operating system, which protects the security of the entire framework layer and the APP layer.

The above summary is for the purpose of illustration only and is not intended to be limiting. In addition to the illustrative aspects, embodiments and features described above, further aspects, embodiments and features of the present disclosure will be readily apparent.

BRIEF DESCRIPTION OF THE DRAWINGS

In the drawings, the same reference numerals denote the same or similar parts or elements throughout all the drawings unless otherwise specified. The drawings are not necessarily drawn to scale. It should be understood that these drawings depict only some embodiments disclosed in accordance with present disclosure and should not be construed as limiting the scope of present disclosure

DETAILED DESCRIPTION OF THE EMBODIMENTS

In the following, only certain embodiments are briefly described. As can be recognized by those skilled in the art, various modifications can be made to the described embodiments without departing from the spirit or scope of present disclosure. Therefore, the drawings and the description are substantially regarded as exemplary intrinsically rather than restrictive.

Figure 1:
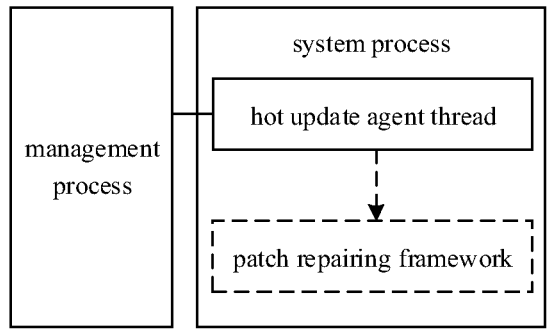
FIG. 1 is a block diagram showing an operating system according to an embodiment of the present disclosure.

An operating system is provided according to an embodiment of the present disclosure. As shown in FIG. 1, the operating system may include a management process, a system process, and a patch repairing framework.

When a system process starts, a hot update agent thread is created in the system process. The hot update agent thread may send startup information of the system process to the management process, receive a patch processing request sent by the management process, and invoke the patch repairing framework to perform an operation corresponding to the patch processing request.

The management process may check whether there is a hot patch corresponding to the system process according to the startup information sent by the hot update agent thread, and send to the hot update agent thread a patch processing request corresponding to the hot patch when it is detected that there is a corresponding hot patch.

In one example, the patch repairing framework may include a hot update engine module integrated into the operating system source code, open a set of APIs to a hot patch repairing agent thread, and execute an operation corresponding to the patch processing request under an invoke of the hot update agent thread.

The operating system according to the embodiment of the present disclosure may be an Android operating system, including a kernel layer, a system runtime library, a Framework, and various applications or apps. The Framework may provide API for system processes.

In an example, by modifying the Framework source code, the entry code of the message processing the management process is added in the creation code of the system process, thereby creating the hot update agent thread in the system process, so that the system process can process the message of the management process through the hot update agent thread.

Figure 2:
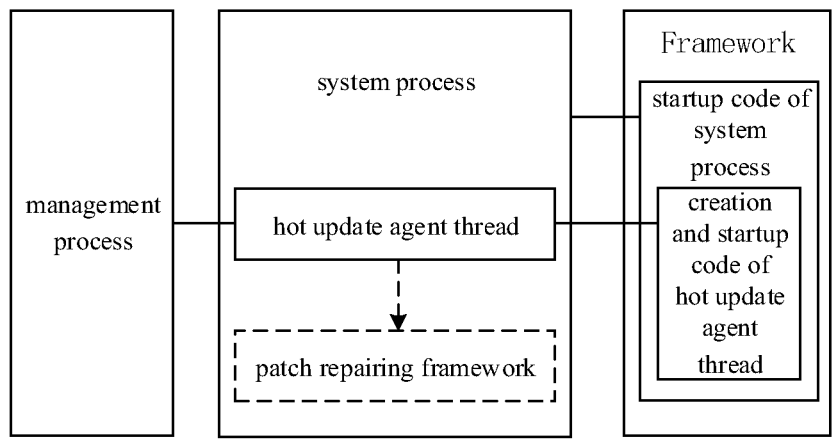
FIG. 2 is a block diagram showing an operating system according to an implementation of an embodiment of the present disclosure.

In an embodiment, as shown in FIG. 2, the creation and startup code of the hot update agent thread may be added to the startup code of the system process by modifying the Framework source code. The startup code of the system process is used to start the system process; and the creation and startup code of the hot update agent thread is used to create and start the hot update agent thread when the system process starts.

In one example, the system process may include a Zygote process and a sub process that is incubated by the Zygote process. The sub process may be a system service (System Server) process or an APP process. The System Server process may be used to start various services of the operating system. For example, the creation and startup code of the hot update agent thread is added in the startup code of the Zygote process. When the Zygote process starts, the hot update agent thread is created and started. The creation and startup code of the hot update agent thread is added in the startup code of the System Server process. When the System Server process starts, the hot update agent thread is created and started. The creation and startup code of the hot update agent thread is added in the startup code of the APP process. When the APP process starts, the hot update agent thread is created and started.

Figure 3:
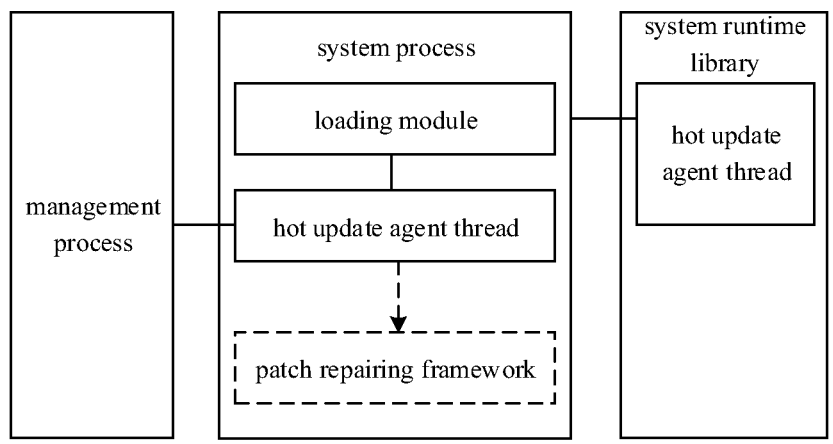
FIG. 3 is a block diagram showing an operating system according to another implementation of an embodiment of the present disclosure.

In an embodiment, as shown in FIG. 3, the operating system according to the embodiment of the present disclosure may include a system runtime library, and the system process may further include a loading module. The system runtime library may provide the operating system with a variety of functions of the programming language core library, for the system process to load and run. Since a hot update agent thread is integrated in the system runtime library, the loading module is used to load the hot update agent thread in the system runtime library when the system process starts, so as to create and start the hot update agent thread in the system process.

In one example, the patch repairing framework may be integrated in the Framework source code. When the system process invokes the framework, the hot update agent thread can load and invoke the patch repairing framework. Alternatively, the patch repairing framework may be stored in the operating system in the form of a java file, for dynamic load and invoke of the hot update agent thread.

Figure 4:
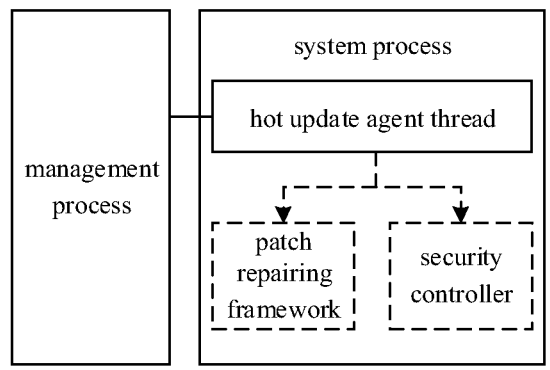
FIG. 4 is a block diagram showing an operating system according to still another implementation of an embodiment of the present disclosure.

In an embodiment, as shown in FIG. 4, the operating system according to the embodiment of the present disclosure may further include a security controller. In one example, the security controller can be a hot update engine permission control module integrated into the operating system source code. The security controller may verify the validity and integrity of the hot patch, and detect the execution permission of the management process, the hot update agent thread, and the patch repairing framework, to prevent unauthorized malicious modification of system code and resources and ensure the security and reliability of the hot update.

Figure 5:
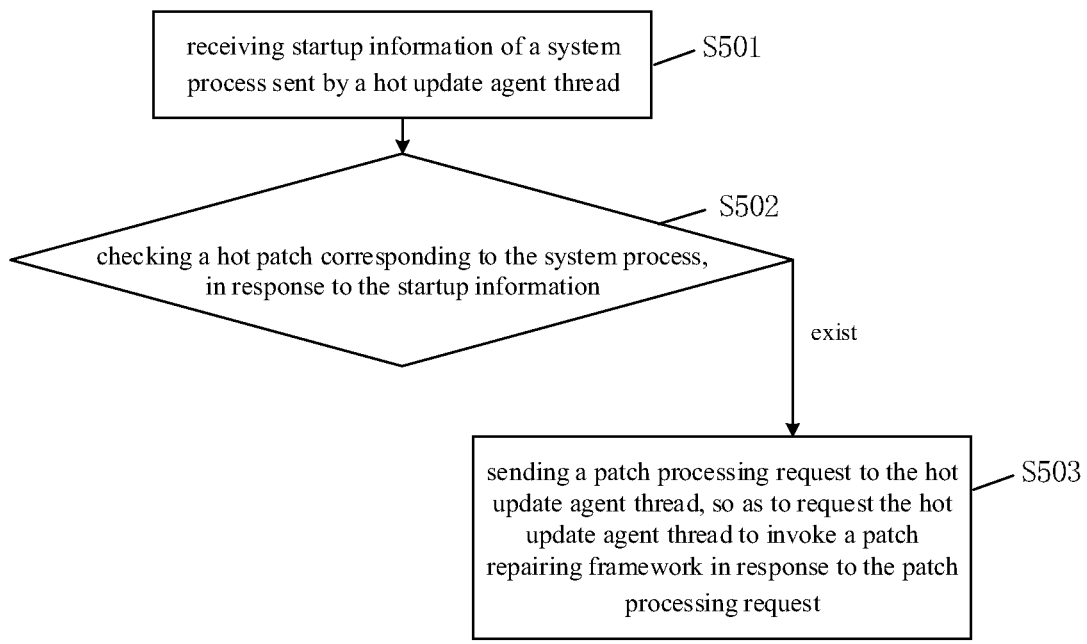
FIG. 5 is a flow chart showing a hot update method according to an embodiment of the present disclosure.

A hot update method is provided according to an embodiment of the present disclosure, which can be applied to the operating system described above. As shown in FIG. 5, the method may include:

S501: receiving startup information of a system process sent by a hot update agent thread;

S502: checking a hot patch corresponding to the system process, in response to the startup information; and S503: sending a patch processing request to the hot update agent thread, so as to request the hot update agent thread to invoke a patch repairing framework in response to the patch processing request.

An example of the hot update method according to the embodiment of the present disclosure will be introduced below with reference to FIG. 6:

In S601, when the system process A1 starts, the hot update agent thread is created in the system process A1.

In S602, the hot update agent thread sends the startup information B of the system process A1 to the management process.

In S603, according to the startup information B, the management process checks whether there is a hot patch C corresponding to the system process A1; if there is a hot patch C, then proceed to S604.

In S604, the management process sends to the hot update agent thread a patch processing request D corresponding to the hot patch C.

In S605, the hot update agent thread, in response to the patch processing request, sends to the patch repairing framework a patch processing command E corresponding to the patch processing request D, so as to invoke the patch repairing framework.

In S606, after receiving the patch processing command E, the patch repairing framework performs an operation corresponding to the patch processing request D.

In S607, the patch repairing framework feeds back to the hot update agent thread the execution result F of the patch processing command E.

In S608, the hot update agent thread sends an execution result F to the management process.

In S609, the hot update agent thread enters a state of waiting for the management process to send a next patch processing request.

Figure 7:
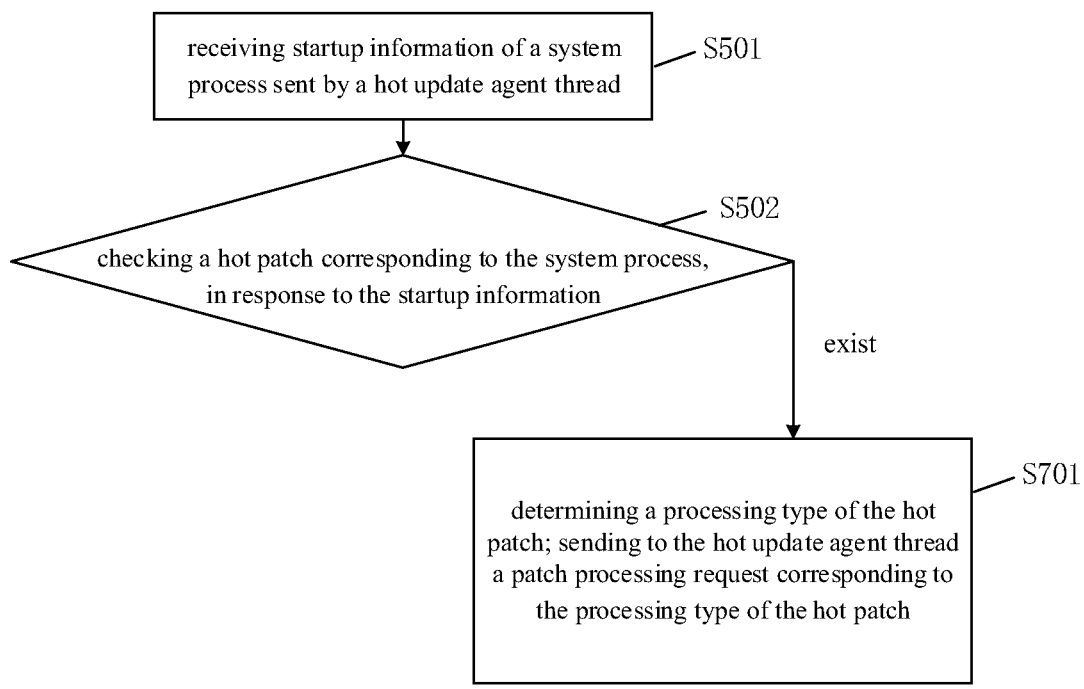
FIG. 7 is a flow chart showing a hot update method according to an implementation of an embodiment of the present disclosure.

In an embodiment, as shown in FIG. 7, in S503, the method may include:

S701: determining a processing type of the hot patch; sending to the hot update agent thread a patch processing request corresponding to the processing type of the hot patch.

Wherein, the processing type includes at least one of a loading type, a loading and repairing type, a repairing type, and an unloading type; the patch processing request includes at least one of a patch loading request, a patch loading and repairing request, a patch repairing request, and a patch unloading request.

In S701, the sending to the hot update agent thread a patch processing request corresponding to the processing type of hot patch, can include:

sending to the hot update agent thread the patch loading request and file information of the hot patch in response to the loading type of the hot patch, so as to request the hot update agent thread to invoke the patch repairing framework to determine the location of the hot patch according to the file information and load the hot patch into the system process;

sending to the hot update agent thread the patch loading and repairing request and file information of the hot patch in response to the loading and repairing type of the hot patch, so as to request the hot update agent thread to invoke the patch repairing framework to determine the location of the hot patch according to the file information, load the hot patch into the system process, and repair a vulnerability with the hot patch;

sending to the hot update agent thread the patch repairing request in response to the repairing type of hot patch, so as to request the hot update agent thread to invoke the patch repairing framework to repair a vulnerability with the hot patch in the system process;

sending to the hot update agent thread the patch unloading request in response to the unloading type of hot patch, so as to request the hot update agent thread to invoke the patch repairing framework to unload the hot patch from the system process.

The processing type is related to the properties of system processes and hot patches and security requirements.

For example, the system process is a Zygote process. Since the Zygote process will lead to multiple sub processes, the hot patch C1 does not apply to all vulnerabilities of the sub processes, and thus the hot patch C1 is a loading type. Correspondingly, the patch processing request corresponding to the hot patch C1 sent by the management process is the patch loading request D1. The hot repairing agent thread, in response to the patch loading request D1, invokes the patch repairing framework to load the hot patch C1 into each sub process. The vulnerability is repaired when the sub process that is applicable to the hot patch C1 starts.

For example, in the case that the system process is an APP process, when the APP process starts and the management process detects that the hot patch C2 corresponding to the APP process has been loaded into the APP process, the processing type of the hot patch C2 is a repairing type. Correspondingly, the patch processing request corresponding to the hot patch C2 sent by the management process is the patch repairing request D2. The hot repairing agent thread, in response to the patch repairing request D2, invokes the patch repairing framework, to repair the vulnerability in the APP process with the hot patch C2.

Figure 6:
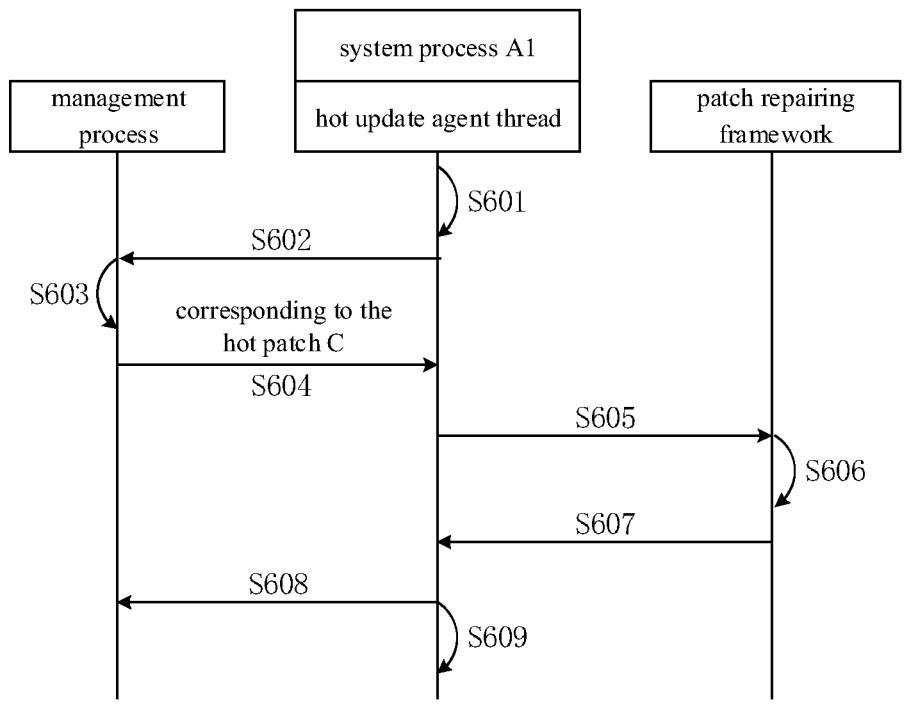
FIG. 6 is a flow chart showing an application example of a hot update method according to an embodiment of the present disclosure.

Referring to FIG. 6, several examples of the hot update method according to the embodiment of the present disclosure will be introduced.

According to example 1, in S604, the management process sends the patch loading request D1 and the file information of the hot patch C to the hot update agent thread; in S605, the hot update agent thread, in response to the patch loading request D1, sends a patch loading command E1 and the file information of the hot patch C to the patch repairing framework. In S606, the patch repairing framework receives the patch loading command E1, determines the location of the hot patch C according to the file information of the hot patch C, and loads the hot patch C into the system process A1.

According to example 2, in S604, the management process sends the patch loading and repairing request D2 and the file information of the hot patch C to the hot update agent thread; in S605, the hot update agent thread, in response to the patch loading repair request D2, sends the patch loading and repairing command E2 and the file information of the hot patch C to the patch repairing framework. In S606, the patch repairing framework receives the patch loading repair command E2, determines the location of the hot patch C according to the file information of the hot patch C, and loads the hot patch C to the system process A1 and uses hot patch C to repair the vulnerability.

According to example 3, in S604, the management process sends the patch repairing request D3 and the file information of the hot patch C to the hot update agent thread; in S605, the hot update agent thread sends a patch repairing command E3 to the patch repairing framework in response to the patch repairing request D3; in S606, the patch repairing framework receives the patch repairing command E3, and repairs the vulnerability in the system process A1 by using the hot patch C.

According to example 4, in S604, the management process sends a patch unloading request D4 to the hot update agent thread; in S605, the hot update agent thread, in response to the patch unloading request D4, sends a patch unloading command E4 to the patch repairing framework; in S606, the patch repairing framework receives the patch unloading command E4 and unloads the hot patch C from the system process A1.

In an example, when the patch processing command received by the patch repairing framework is the patch loading and repairing command E2 or the patch repairing command E3, the execution process of the patch repairing framework may include:

S11: obtaining a vulnerability method tag and a repairing method according to the hot patch C;

S12: determining the address of the vulnerability according to the vulnerability method tag;

S13: suspending the thread in the system process A1 that is not related to the process of repairing the vulnerability;

S14: performing a vulnerability repairing process in a manner of method instruction replacement;

S15: after the process of repairing the vulnerability ends, restoring execution of each thread in the system process A1;

S16: returning the execution result of the patch processing command to the hot update agent thread.

Figure 8:
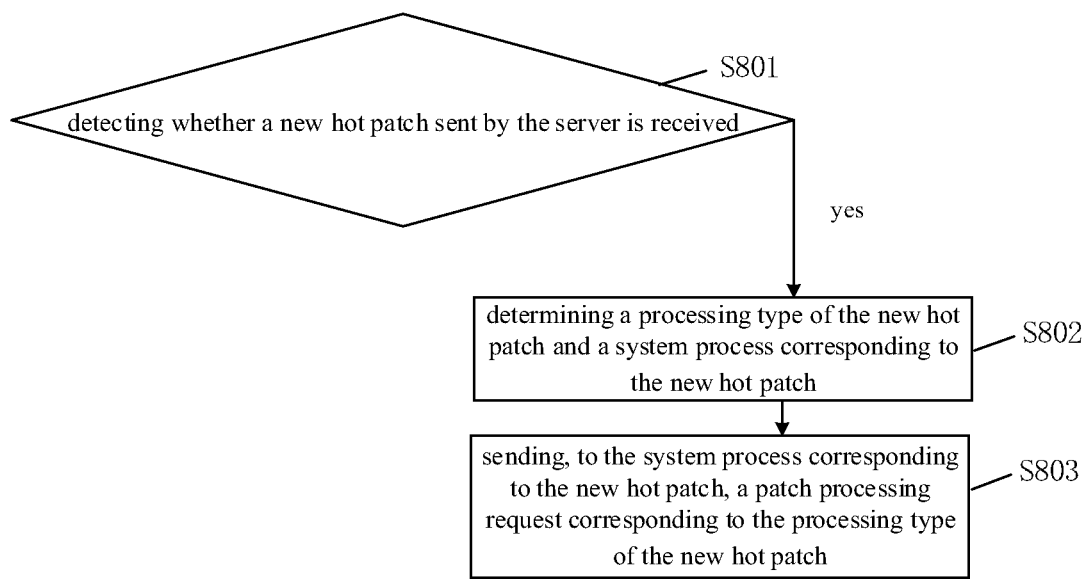
FIG. 8 is a flow chart showing a hot update method according to another implementation of an embodiment of the present disclosure.

In an embodiment, as shown in FIG. 8, the hot update method according to the embodiment of the present disclosure may further include:

S801: detecting whether a new hot patch sent by the server is received, if yes, proceed to step S802;

S802: determining a processing type of the new hot patch and a system process corresponding to the new hot patch;

S803: sending, to the system process corresponding to the new hot patch, a patch processing request corresponding to the processing type of the new hot patch.

Figure 9:
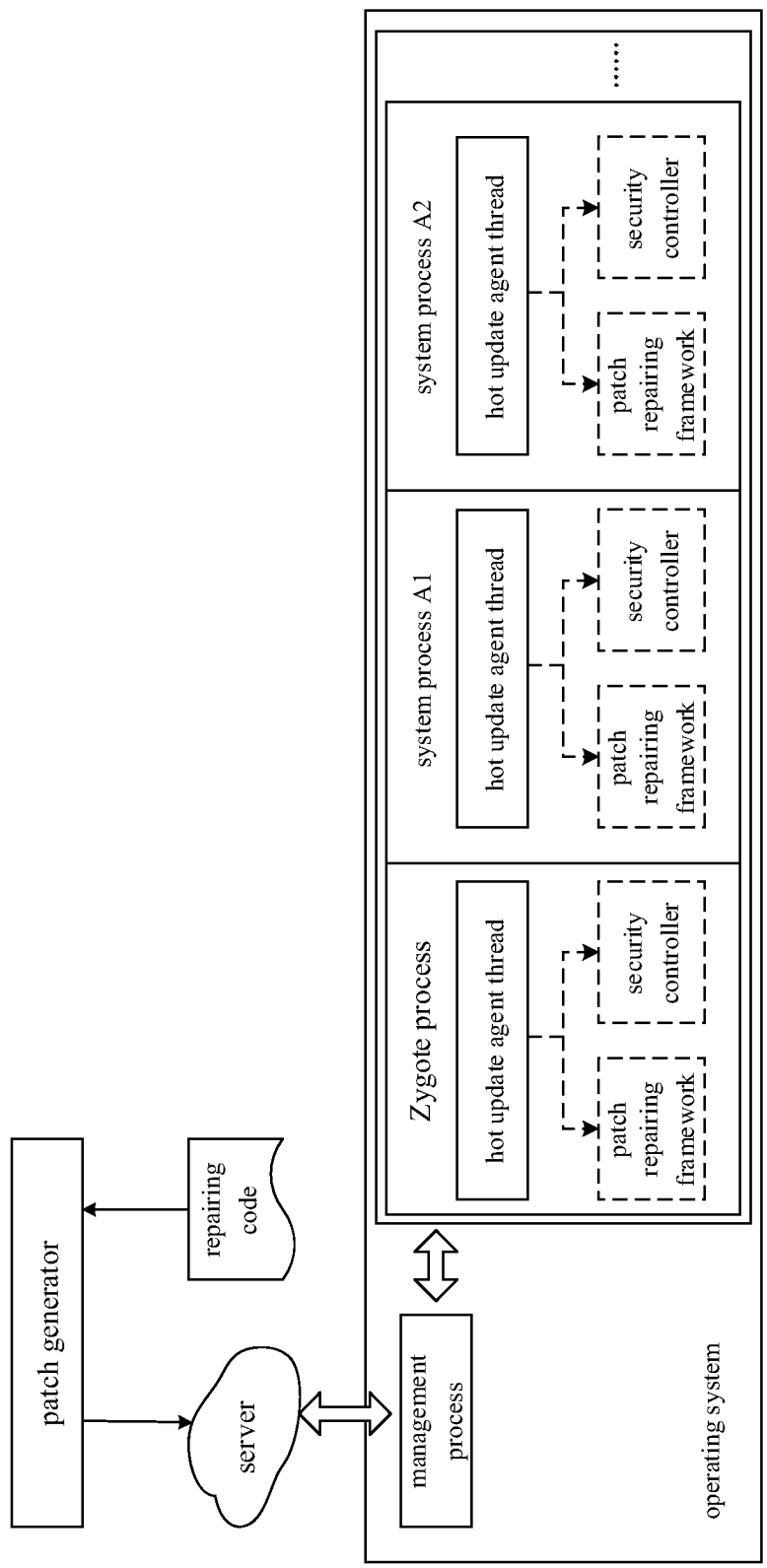
FIG. 9 shows an application scenario diagram of a hot update method according to an embodiment of the present disclosure.

An application example of the operating system and the hot update method according to the embodiment of the present disclosure is introduced below with reference to FIG. 9. The operating system and the hot update method according to the embodiment of the present disclosure can be applied to terminal devices such as a smart phone or a tablet.

The patch generator can receive the input repairing code, generate a hot patch in the custom patch format, and encrypt the generated hot patch. The system process can include a Zygote process and a plurality of sub processes A1, A2, and so on. The server can send a hot patch to the management process according to the request of the management process. The management process can perform the following process on all system processes:

S21: determining a system process to which the hot patch C0 applies, such as system process A2;

S22: determining a processing type of the hot patch C0, such as a loading type (or a loading and repairing type);

S23: sending a patch loading request (or a patch loading and repairing request) and the file information of the hot patch C0 to the hot update agent thread of the system process A2;

S24: in response to the patch loading request (or the patch loading and repairing request), sending, by the hot update agent thread, a patch loading command (or a patch loading and repairing command) to the patch repairing framework, to invoke the patch repairing framework;

S25: determining, by the patch repairing framework, the location of the hot patch C0 according to the file information of the hot patch C0, and loading the hot patch C0 into the system process A2 (or loading the hot patch C0 into the system process A2, and repairing the vulnerability in the system process A2 by using the hot patch C0);

S26: feeding, by the patch repairing framework, an execution result of the patch loading command (or the patch loading and repairing command) back to the hot update agent thread;

S27: sending, by the hot update agent thread, the execution result to the management process;

S28: entering, by the hot update agent thread, a state of waiting for the management process to send a next patch processing request.

In this example, when any of the system processes starts (for example, system process A1), a hot update agent thread is created in the system process and can perform the hot update method described above. The method for creating and starting the hot update agent thread can be found in the above description of the operating system.

In an embodiment, the hot update method according to the embodiment of the present disclosure may further include:

receiving, by the hot update agent thread, the patch processing request, and invoking a security controller to detect whether the received patch processing request is permissible, wherein a first safety signal is returned from the security controller to the hot update agent thread in response to a permissible patch processing request;

invoking, by the hot update agent thread, the patch repairing framework to perform an operation corresponding to the patch processing request in response to the first safety signal.

Figure 10:
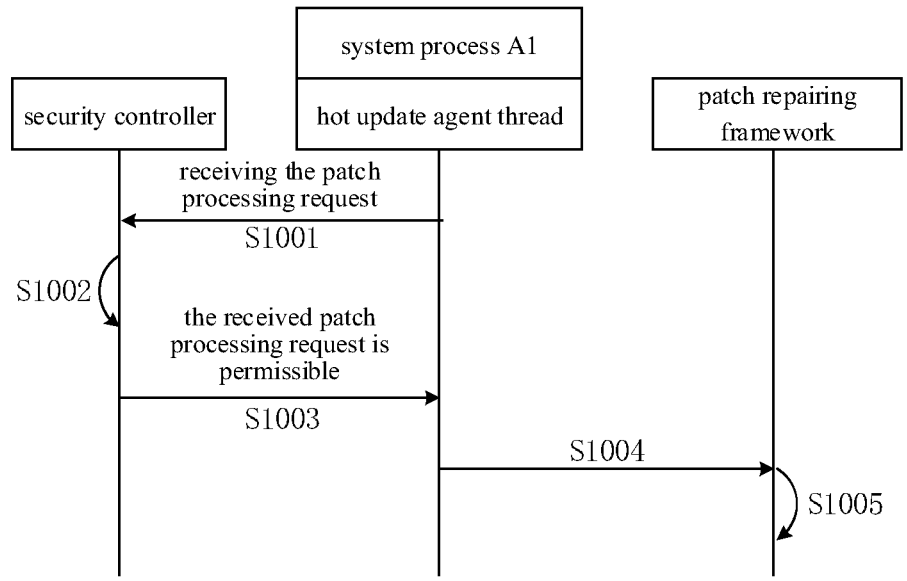
FIG. 10 is a flow chart showing another application example of a hot update method according to an embodiment of the present disclosure.

For example, as shown in FIG. 10, the hot update method according to the embodiment of the present disclosure may include S1001-S1005.

In S1001, the hot update agent thread invokes the security controller upon receiving the patch processing request sent by the management process.

In S1002, the security controller detects whether the received patch processing request is permissible, and when it detects that the received patch processing request is permissible, proceed to step S1003.

In S1003, the security controller feeds back a first security signal to the hot update agent thread.

In S1004, after receiving the first security signal, in response to the patch processing request, the hot update agent thread sends to the patch repairing framework a patch processing command corresponding to the patch processing request, to invoke the patch repairing framework.

In S1005, after receiving the patch processing command, the patch repairing framework performs an operation corresponding to the patch processing request.

In an embodiment, when the patch processing request is a patch loading request or a patch loading and repairing request, the security controller is further configured to verify validity and integrity of the hot patch, and when the validity and integrity of the hot patch is verified, feed a second security signal back to the hot update agent thread, wherein the hot update agent thread is configured to invoke the patch repairing framework to load the hot patch into the system process in response to the second safety signal.

Figure 11:
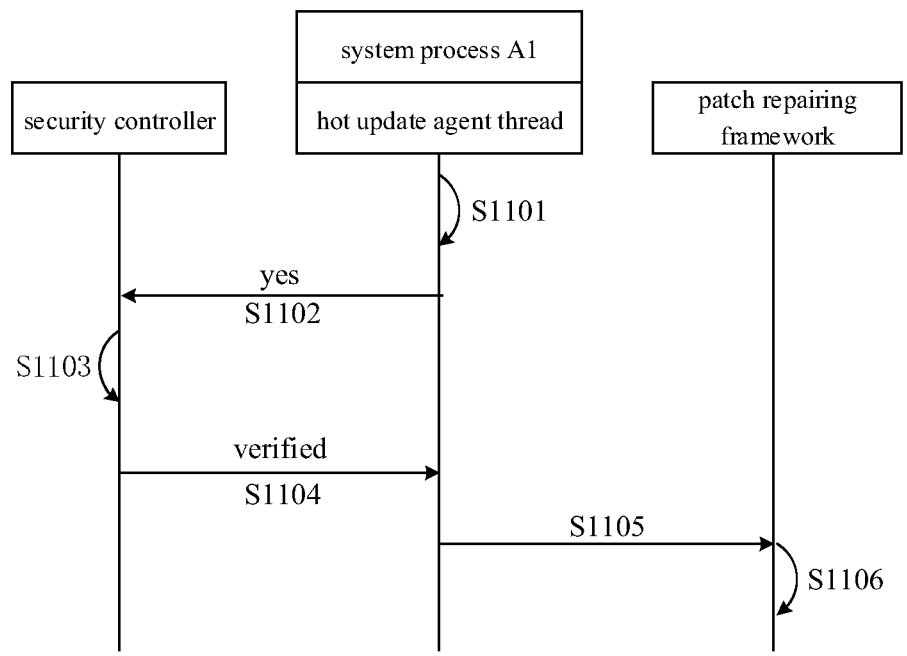
FIG. 11 is a flow chart showing still another application example of a hot update method according to an embodiment of the present disclosure.

For example, as shown in FIG. 11, the hot update method according to the embodiment of the present disclosure may include S1101-S1106.

In S1101, the hot update agent thread, upon receiving the patch processing request sent by the management process, determines whether the patch processing request is a patch loading request or a patch loading and repairing request, and if yes, proceed to S1102.

In S1102, the hot update agent thread invokes a security controller.

In S1103, the security controller checks the validity and integrity of the hot patch; if the validity and integrity of the hot patch is verified, proceed to step S1104.

In S1104, the security controller feeds a second security signal back to the hot update agent thread.

In S1105, after receiving the second security signal, in response to the patch processing request, the hot update agent thread sends to the patch repairing framework a patch processing command corresponding to the patch processing request, to invoke the patch repairing framework.

In S1106, after receiving the patch processing command, the patch repairing framework performs an operation corresponding to the patch processing request.

In an embodiment, the file of the hot patch can be sent to the hot update agent thread through the management process by using the communication manner between processes of the operating system, such as a pipe communication method or a binder communication mechanism.

In an embodiment, the file of the hot patch can be stored in a shared directory or a private directory set with limited permissions, and the management process sends the file information of the hot patch to the hot update agent thread, so that the patch repairing framework can load the hot patch in the shared directory or private directory according to the file information.

Figure 12:
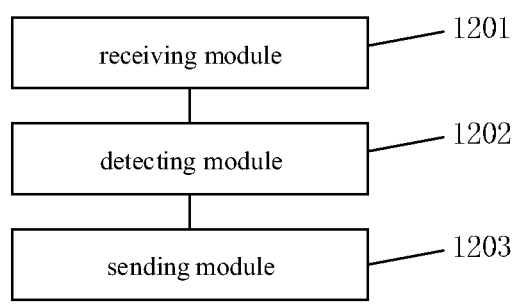
FIG. 12 is a structural block diagram of a hot update apparatus according to an embodiment of the present disclosure.

A hot update apparatus is further provided according to an embodiment of the disclosure, which can be applied to the management process. FIG. 12 is a structural block diagram of a hot update apparatus according to an embodiment of the present disclosure. As shown in FIG. 12, the apparatus may include:

a receiving module 1201, configured to receive startup information of a system process sent by a hot update agent thread;

a detecting module 1202, configured to check a hot patch corresponding to the system process, in response to the startup information;

a sending module 1203, configured to send a patch processing request to the hot update agent thread, so as to request the hot update agent thread to invoke a patch repairing framework in response to the patch processing request.

In an embodiment, the sending module 1203 can be configured to:

determine a processing type of the hot patch, and send to the hot update agent thread a patch processing request corresponding to the processing type of the hot patch.

In one embodiment, the processing type includes at least one of a loading type, a loading and repairing type, a repairing type, and an unloading type; and the patch processing request includes at least one of a patch loading request, a patch loading and repairing request, a patch repairing request and a patch unloading request.

The sending module is configured to send to the hot update agent thread the patch loading request and file information of the hot patch in response to the loading type of the hot patch, so as to request the hot update agent thread to invoke the patch repairing framework to determine the location of the hot patch according to the file information and load the hot patch into the system process.

The sending module is configured to send to the hot update agent thread the patch loading and repairing request and file information of the hot patch in response to the loading and repairing type of the hot patch, so as to request the hot update agent thread to invoke the patch repairing framework to determine the location of the hot patch according to the file information, load the hot patch into the system process, and repair a vulnerability with the hot patch.

The sending module is configured to send to the hot update agent thread the patch repairing request in response to the repairing type of hot patch, so as to request the hot update agent thread to invoke the patch repairing framework to repair a vulnerability with the hot patch in the system process.

The sending module is configured to send to the hot update agent thread the patch unloading request in response to the unloading type of hot patch, so as to request the hot update agent thread to invoke the patch repairing framework to unload the hot patch from the system process.

In an embodiment, the hot update apparatus according to the embodiment of the present disclosure may further include:

a patch management module, configured to download a hot patch from a server, to unload or replace a hot patch from a management process, or to verify validity and integrity of a hot patch;

a state management module, configured to maintain the status of the hot patch.

The functions of the modules in the apparatus according to the embodiment of the present disclosure, has been described in the foregoing method, and will not be described herein again.

In summary, the operating system and the hot update method according to the embodiments create a hot repairing agent thread in the system process, invoke a patch repairing framework according to the interaction between the hot repairing agent thread and the management process, and dynamically repair each system process in real time without the need to restart the operating system, so that hot update of the framework can be implemented, hot repair of vulnerabilities of the system can be implemented, and secure the entire Framework layer and the app layer.

Further, the hot update can be implemented by means of source code integration, which has low intrusion to the operating system and is simple and easy to implement and maintains security and reliability; the patch loading and repairing time can be customized, the loading and repairing are separated, and the security controller is combined to ensure high performance, security and reliability of the hot update process, which can cooperate with the cloud server distribution mechanism, as a complete framework hot repairing solution, accelerate the Android vulnerability repair cycle and save the post-maintenance cost.

Figure 13:
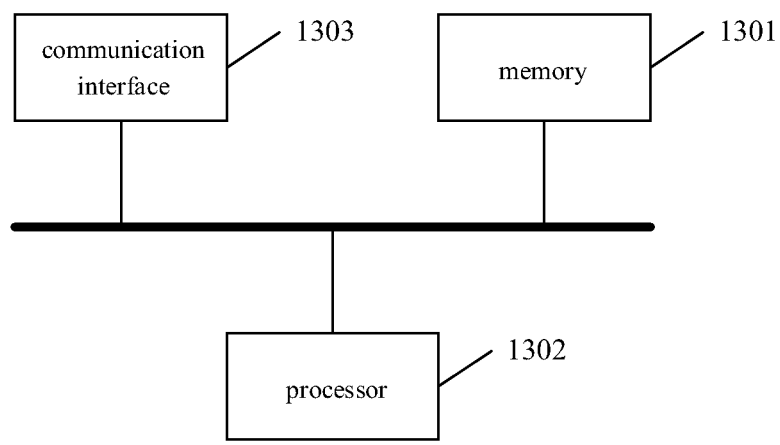
FIG. 13 is a structural block diagram of a terminal device according to an embodiment of the present disclosure.

FIG. 13 is a structural block diagram of a terminal device according to an embodiment of the present disclosure. As shown in FIG. 13, the terminal device includes a memory 1301 and a processor 1302 in which a computer program executable on the processor 1302 is stored. The processor 1302 implements the hot update method described in the above embodiment when executing the computer program. The number of the memory 1301 and the processor 1302 can be one or more.

The terminal device further includes:

a communication interface 1303, configured to communicate with an external device for data interactive transmission;

a memory 1301, which may include a high speed RAM memory and may also include a non-volatile memory such as at least one disk memory.

If the memory 1301, the processor 1302, and the communication interface 1303 are implemented independently, the memory 1301, the processor 1302, and the communication interface 1303 can be connected to one another through a bus and complete communication with one another. The bus can be an Industrial Standard Architecture (ISA) bus, a Peripheral Component Interconnect (PCI) bus, or an Extended Industry Standard Component (EISA) bus. The bus can be divided into an address bus, a data bus, a control bus, and the like. For the purpose of easy representation, only one thick line is shown in FIG. 13, but it does not mean that there is only one bus or one type of bus.

Optionally, in a specific implementation, if the memory 1301, the processor 1302, and the communication interface 1303 are integrated on one chip, the memory 1301, the processor 1302, and the communication interface 1303 can complete communication with one another through the internal interface.

An embodiment of the present disclosure provides a computer readable storage medium storing a computer program, which when executed by a processor, implements the method described in any of the above embodiments.

In the description of the present specification, the description referring to the terms "one embodiment", "some embodiments", "an example", "a specific example", or "some examples" and the like means particular features, structures, materials, or characteristics included in at least one embodiment or example of present disclosure described in combination with the embodiment or example. Furthermore, the specific features, structures, materials, or characteristics described can be combined in any suitable manner in any one or more of the embodiments or examples. In addition, different embodiments or examples described in this specification and features of different embodiments or examples can be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein can be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, can be thought of as a sequencing listing of executable instructions for implementing logic functions, which can be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" can be any device that can contain, store, communicate, propagate, or transport the program for use by or in connection with the instruction execution system, device, or apparatus. The computer-readable medium described in the embodiments of present disclosure can be a computer-readable signal medium or a computer-readable storage medium or any combination thereof. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium can even be paper or other suitable medium upon which the program can be printed, as it can be read, for example, by optical scanning of the paper or other medium, followed by editing, interpretation or, where appropriate, process otherwise to electronically obtain the program, which is then stored in a computer memory.

It should be understood that various portions of the present application can be implemented by hardware, software, firmware, or a combination thereof. In the above embodiments, a plurality of steps or methods can be implemented in software or firmware stored in memory and executed by a suitable instruction execution system. For example, if implemented in hardware, as in another embodiment, they can be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments can be implemented by a program instructing relevant hardware. The program can be stored in a computer-readable storage medium, and when executed, one of the steps of the method embodiment or a combination thereof is included.

In addition, each of the functional units in the embodiments of the present application can be integrated in one processing module, or each of the units may exist alone physically, or two or more units can be integrated in one module. The above-mentioned integrated module can be implemented in the form of hardware or in the form of software functional module. When the integrated module is implemented in the form of a software functional module and is sold or used as an independent product, the integrated module may also be stored in a computer-readable storage medium. The storage medium can be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A hot update method, comprising:
   receiving, by a management process, startup information of an inherent process in an operating system, which is sent by a hot update agent thread corresponding to the inherent process in the operating system;
   checking, by the management process, whether there is a hot patch corresponding to the inherent process in the operating system, in response to receiving the startup information; and
   in a case where there is a hot patch corresponding to the inherent process in the operating system, sending, by the management process, a patch processing request to the hot update agent thread, so as to request the hot update agent thread to invoke a patch repairing framework for performing a patch repairing processing on the inherent process in the operating system, in response to receiving the patch processing request;
   wherein the sending, by the management process, the patch processing request to the hot update agent thread, so as to request the hot update agent thread to invoke the patch repairing framework for performing the patch repairing processing on the inherent process in the operating system, in response to receiving the patch processing request, further comprises:

determining, by the management process, a processing type of the hot patch; and sending, by the management process, a patch processing request corresponding to the processing type of the hot patch to the hot update agent thread, so as to request the hot update agent thread to invoke the patch repairing framework for performing the patch repairing processing on the inherent process in the operating system, in response to receiving the patch processing request;

wherein the processing type of the hot patch comprises at least one of a loading type, a loading and repairing type, a repairing type, and an unloading type, and wherein the patch processing request comprises at least one of a patch loading request, a patch loading and repairing request, a patch repairing request, and a patch unloading request; and wherein the sending, by the management process, the patch processing request corresponding to the processing type of the hot patch to the hot update agent thread, so as to request the hot update agent thread to invoke the patch repairing framework for performing the patch repairing processing on the inherent process in the operating system, in response to receiving the patch processing request corresponding to the processing type of the hot patch, further comprises:

sending, by the management process, to the hot update agent thread, the patch loading request and file information of the hot patch in response to the loading type of the hot patch, so as to request the hot update agent thread to invoke the patch repairing framework to determine a location of the hot patch according to the file information and load the hot patch into the inherent process in the operating system;

sending, by the management process, to the hot update agent thread, the patch loading and repairing request and file information of the hot patch in response to the loading and repairing type of the hot patch, so as to request the hot update agent thread to invoke the patch repairing framework to determine a location of the hot patch according to the file information, load the hot patch into the inherent process in the operating system, and repair a vulnerability in the inherent process in the operating system with the hot patch;

sending, by the management process, to the hot update agent thread, the patch repairing request in response to the repairing type of the hot patch, so as to request the hot update agent thread to invoke the patch repairing framework to repair a vulnerability in the inherent process in the operating system with the hot patch; and sending, by the management process, to the hot update agent thread, the patch unloading request in response to the unloading type of the hot patch, so as to request the hot update agent thread to invoke the patch repairing framework to unload the hot patch from the inherent process in the operating system.

2. The hot update method according to claim 1, further comprising:

receiving a new hot patch sent by a server, and determining, by the management process, a processing type of the new hot patch and a new inherent process in the operating system corresponding to the new hot patch; and sending to the new inherent process in the operating system corresponding to the new hot patch, a patch processing request corresponding to the processing type of the new hot patch.

3. The hot update method according to claim 1, further comprising:

receiving, by the hot update agent thread, the patch processing request, and invoking, by the hot update agent thread, a security controller to detect whether the received patch processing request is permissible, wherein a first security signal is returned from the security controller to the hot update agent thread in response to a permissible patch processing request; and invoking, by the hot update agent thread, the patch repairing framework to perform a patch repairing processing on the inherent process in the operating system in response to the returned first security signal.

4. The hot update method according to claim 3, wherein the receiving, by the hot update agent thread, the patch processing request, and invoking the security controller to detect whether the received patch processing request is permissible, further comprises:

invoking, by the hot update agent thread, the security controller to verify validity and integrity of the hot patch, in response to the patch processing request being a patch loading request or a patch loading and repairing request, wherein when the validity and integrity of the hot patch are verified, a second security signal is returned by the security controller to the hot update agent thread; and invoking, by the hot update agent thread, the patch repairing framework to load the hot patch into the inherent process in the operating system in response to the returned second security signal.

5. The hot update method according to claim 1, further comprising:

starting the inherent process in the operating system based on a startup code of the inherent process in the operating system, wherein the startup code of the inherent process in the operating system comprises a creation and startup code of the hot update agent thread; and creating and starting the hot update agent thread in response to a start of the inherent process in the operating system.

6. The hot update method according to claim 1, wherein the inherent process in the operating system loads a system runtime library in response to a start of the inherent process in the operating system, to create and start the hot update agent thread in the inherent process in the operating system, and wherein the system runtime library comprises the hot update agent thread.

7. A terminal device, comprising:

one or more processors; and a tangible non-transitory computer-readable storage medium configured to store computer executable instructions;

wherein the computer executable instructions, when executed by the one or more processors, cause the one or more processors to:

receive, by a management process, startup information of an inherent process in an operating system, which is sent by a hot update agent thread corresponding to the inherent process in the operating system;

check, by the management process, whether there is a hot patch corresponding to the inherent process in the operating system, in response to receiving the startup information; and in a case where there is a hot patch corresponding to the inherent process in the operating system, send, by the management process, a patch processing request to the hot update agent thread, so as to request the hot update agent thread to invoke a patch repairing framework for performing a patch repairing processing on the inherent process in the operating system, in response to receiving the patch processing request;

wherein, when the computer executable instructions are executed by the one or more processors to cause the one or more processors to send, by the management process, the patch processing request to the hot update agent thread, so as to request the hot update agent thread to invoke the patch repairing framework for performing the patch repairing processing on the inherent process in the operating system, in response to receiving the patch processing request, the computer executable instructions, when executed by the one or more processors, cause the one or more processors further to:

determine, by the management process, a processing type of the hot patch; and send, by the management process, a patch processing request corresponding to the processing type of the hot patch to the hot update agent thread, so as to request the hot update agent thread to invoke the patch repairing framework for performing the patch repairing processing on the inherent process in the operating system, in response to receiving the patch processing request;

wherein the processing type of the hot patch comprises at least one of a loading type, a loading and repairing type, a repairing type, and an unloading type, and wherein the patch processing request comprises at least one of a patch loading request, a patch loading and repairing request, a patch repairing request, and a patch unloading request; and wherein, when the computer executable instructions are executed by the one or more processors to cause the one or more processors to send, by the management process, the patch processing request corresponding to the processing type of the hot patch to the hot update agent thread, so as to request the hot update agent thread to invoke the patch repairing framework for performing the patch repairing processing on the inherent process in the operating system, in response to receiving the patch processing request corresponding to the processing type of the hot patch, the computer executable instructions, when executed by the one or more processors, cause the one or more processors further to:

send, by the management process, to the hot update agent thread, the patch loading request and file information of the hot patch in response to the loading type of the hot patch, so as to request the hot update agent thread to invoke the patch repairing framework to determine a location of the hot patch according to the file information and load the hot patch into the inherent process in the operating system;

send, by the management process, to the hot update agent thread, the patch loading and repairing request and file information of the hot patch in response to the loading and repairing type of the hot patch, so as to request the hot update agent thread to invoke the patch repairing framework to determine a location of the hot patch according to the file information, load the hot patch into the inherent process in the operating system, and repair a vulnerability in the inherent process in the operating system with the hot patch;

send, by the management process, to the hot update agent thread, the patch repairing request in response to the repairing type of the hot patch, so as to request the hot update agent thread to invoke the patch repairing framework to repair a vulnerability in the inherent process in the operating system with the hot patch; and send, by the management process, to the hot update agent thread, the patch unloading request in response to the unloading type of the hot patch, so as to request the hot update agent thread to invoke the patch repairing framework to unload the hot patch from the inherent process in the operating system.

8. The terminal device according to claim 7, wherein the computer executable instructions, when executed by the one or more processors, cause the one or more processors further to:

receive a new hot patch sent by a server, and determine, by the management process, a processing type of the new hot patch and a new inherent process in the operating system corresponding to the new hot patch; and send to the new inherent process in the operating system corresponding to the new hot patch, a patch processing request corresponding to the processing type of the new hot patch.

9. The terminal device according to claim 7, wherein the computer executable instructions, when executed by the one or more processors, cause the one or more processors further to:

receive, by the hot update agent thread, the patch processing request, and invoke, by the hot update agent thread, a security controller to detect whether the received patch processing request is permissible, wherein a first security signal is returned from the security controller to the hot update agent thread in response to a permissible patch processing request; and invoke, by the hot update agent thread, the patch repairing framework to perform a patch repairing processing on the inherent process in the operating system in response to the returned first security signal.

10. The terminal device according to claim 9, wherein the receiving, by the hot update agent thread, the patch processing request, and invoking a security controller to detect whether the received patch processing request is permissible, further comprises:

invoke, by the hot update agent thread, the security controller to verify validity and integrity of the hot patch, in response to the patch processing request being a patch loading request or a patch loading and repairing request, wherein when the validity and integrity of the hot patch are verified, a second security signal is returned by the security controller to the hot update agent thread; and invoke, by the hot update agent thread, the patch repairing framework to load the hot patch into the inherent process in the operating system in response to the returned second security signal.

11. The terminal device according to claim 7, wherein the computer executable instructions, when executed by the one or more processors, cause the one or more processors further to:

start the inherent process in the operating system based on a startup code of the inherent process in the operating system, wherein the startup code of the inherent process in the operating system comprises a creation and startup code of the hot update agent thread; and create and starting the hot update agent thread in response to a start of the inherent process in the operating system.

12. The terminal device according to claim 7, wherein the inherent process in the operating system loads a system runtime library in response to a start of the inherent process in the operating system, to create and start the hot update agent thread in the inherent process in the operating system, and wherein the system runtime library comprises the hot update agent thread.

13. A tangible non-transitory computer-readable storage medium having computer executable instructions encoded thereon, wherein the computer executable instructions, when executed by a processor, cause the processor to:
receive, by a management process, startup information of an inherent process in an operating system, which is sent by a hot update agent thread corresponding to the inherent process in the operating system;
check, by the management process, whether there is a hot patch corresponding to the inherent process in the operating system, in response to receiving the startup information; and
in a case where there is a hot patch corresponding to the inherent process in the operating system, send, by the management process, a patch processing request to the hot update agent thread, so as to request the hot update agent thread to invoke a patch repairing framework for performing a patch repairing processing on the inherent process in the operating system, in response to receiving the patch processing request;
wherein, when the computer executable instructions are executed by the processor to cause the processor to send, by the management process, the patch processing request to the hot update agent thread, so as to request the hot update agent thread to invoke the patch repairing framework for performing the patch repairing processing on the inherent process in the operating system, in response to receiving the patch processing request, the computer executable instructions are executed by the processor further cause the processor to specifically perform operations of:
determining, by the management process, a processing type of the hot patch; and
sending, by the management process, a patch processing request corresponding to the processing type of the hot patch to the hot update agent thread, so as to request the hot update agent thread to invoke the patch repairing framework for performing the patch repairing processing on the inherent process in the operating system, in response to receiving the patch processing request;
wherein the processing type of the hot patch comprises at least one of a loading type, a loading and repairing type, a repairing type, and an unloading type, and wherein the patch processing request comprises at least one of a patch loading request, a patch loading and repairing request, a patch repairing request, and a patch unloading request; and
wherein, when the computer executable instructions are executed by the processor to cause the processor to send, by the management process, the patch processing request corresponding to the processing type of the hot patch to the hot update agent thread, so as to request the hot update agent thread to invoke the patch repairing framework for performing the patch repairing processing on the inherent process in the operating system, in response to receiving the patch processing request corresponding to the processing type of the hot patch, the computer executable instructions are executed by the processor further cause the processor to specifically perform operations of:
sending, by the management process, to the hot update agent thread, the patch loading request and file information of the hot patch in response to the loading type of the hot patch, so as to request the hot update agent thread to invoke the patch repairing framework to determine a location of the hot patch according to the file information and load the hot patch into the inherent process in the operating system;
sending, by the management process, to the hot update agent thread, the patch loading and repairing request and file information of the hot patch in response to the loading and repairing type of the hot patch, so as to request the hot update agent thread to invoke the patch repairing framework to determine a location of the hot patch according to the file information, load the hot patch into the inherent process in the operating system, and repair a vulnerability in the inherent process in the operating system with the hot patch;
sending, by the management process, to the hot update agent thread, the patch repairing request in response to the repairing type of the hot patch, so as to request the hot update agent thread to invoke the patch repairing framework to repair a vulnerability in the inherent process in the operating system with the hot patch; and
sending, by the management process, to the hot update agent thread, the patch unloading request in response to the unloading type of the hot patch, so as to request the hot update agent thread to invoke the patch repairing framework to unload the hot patch from the inherent process in the operating system.

14. A system, comprising:
one or more processors; and
a tangible non-transitory computer-readable storage medium storing computer executable instructions that, when executed by the one or more processors, cause the one or more processors to execute an operating system, wherein the operating system comprises:
an inherent process;
a management process;
a hot update agent thread; and
a patch repairing framework;
wherein the management process is configured to receive startup information of the inherent process in the operating system, which is sent by the hot update agent thread corresponding to the inherent process in the operating system, check whether there is a hot patch corresponding to the inherent process in the operating system in response to receiving the startup information, and in a case where there is a hot patch corresponding to the inherent process in the operating system, send a patch processing request to the hot update agent thread, so as to request the hot update agent thread to invoke the patch repairing framework for performing a patch repairing processing on the inherent process in the operating system, in response to receiving the patch processing request;
wherein, when the management process is configured to send the patch processing request to the hot update agent thread, so as to request the hot update agent thread to invoke the patch repairing framework for performing the patch repairing processing on the inherent process in the operating system, in response to receiving the patch processing request, the management process is further configured to:

determine a processing type of the hot patch; and send a patch processing request corresponding to the processing type of the hot patch to the hot update agent thread, so as to request the hot update agent thread to invoke the patch repairing framework for performing the patch repairing processing on the inherent process in the operating system, in response to receiving the patch processing request;

wherein the processing type of the hot patch comprises at least one of a loading type, a loading and repairing type, a repairing type, and an unloading type, and wherein the patch processing request comprises at least one of a patch loading request, a patch loading and repairing request, a patch repairing request, and a patch unloading request; and wherein, when the management process is configured to send the patch processing request corresponding to the processing type of the hot patch to the hot update agent thread, so as to request the hot update agent thread to invoke the patch repairing framework for performing the patch repairing processing on the inherent process in the operating system, in response to receiving the patch processing request, the management process is further configured to:

send, to the hot update agent thread, the patch loading request and file information of the hot patch in response to the loading type of the hot patch, so as to request the hot update agent thread to invoke the patch repairing framework to determine a location of the hot patch according to the file information and load the hot patch into the inherent process in the operating system;

send, to the hot update agent thread, the patch loading and repairing request and file information of the hot patch in response to the loading and repairing type of the hot patch, so as to request the hot update agent thread to invoke the patch repairing framework to determine a location of the hot patch according to the file information, load the hot patch into the inherent process in the operating system, and repair a vulnerability in the inherent process in the operating system with the hot patch;

send, to the hot update agent thread, the patch repairing request in response to the repairing type of the hot patch, so as to request the hot update agent thread to invoke the patch repairing framework to repair a vulnerability in the inherent process in the operating system with the hot patch; and send, to the hot update agent thread, the patch unloading request in response to the unloading type of the hot patch, so as to request the hot update agent thread to invoke the patch repairing framework to unload the hot patch from the inherent process in the operating system.

* * * * *